United States Patent
Duchi et al.

(10) Patent No.: US 12,489,383 B2
(45) Date of Patent: Dec. 2, 2025

(54) METHOD AND SYSTEM FOR CALIBRATING A CONTROL DEVICE OF AN ELECTRIC MOTOR

(71) Applicant: AVL LIST GMBH, Graz (AT)

(72) Inventors: Francesco Duchi, Graz (AT); Pirmin Proier, Graz (AT); Jakob Moder, Unzmarkt (AT); Rüdiger Teichmann, Hart bei Graz (AT)

(73) Assignee: AVL LIST GMBH, Graz (AT)

(*) Notice: Subject to any disclaimer, the term of this patent is extended or adjusted under 35 U.S.C. 154(b) by 240 days.

(21) Appl. No.: 17/776,474

(22) PCT Filed: Nov. 13, 2020

(86) PCT No.: PCT/AT2020/060403
§ 371 (c)(1),
(2) Date: May 12, 2022

(87) PCT Pub. No.: WO2021/092641
PCT Pub. Date: May 20, 2021

(65) Prior Publication Data
US 2022/0407440 A1 Dec. 22, 2022

(30) Foreign Application Priority Data
Nov. 13, 2019 (AT) ............... A 50974/2019

(51) Int. Cl.
*H02P 21/05* (2006.01)
*G01L 1/16* (2006.01)
(Continued)

(52) U.S. Cl.
CPC ............... *H02P 21/05* (2013.01); *G01L 1/16* (2013.01); *G01L 3/10* (2013.01); *G01L 5/0028* (2013.01);
(Continued)

(58) Field of Classification Search
CPC .......... H02P 21/05; H02P 21/20; H02P 21/22; H02P 2207/01; H02P 2207/05; G01L 1/16; G01L 3/10
(Continued)

(56) References Cited

U.S. PATENT DOCUMENTS

| | | | |
|---|---|---|---|
| 8,018,193 B1 * | 9/2011 | Pekarek | H02P 23/12 |
| | | | 318/400.15 |
| 2004/0079173 A1 * | 4/2004 | Neely | H02P 6/10 |
| | | | 73/862.333 |

(Continued)

FOREIGN PATENT DOCUMENTS

| | | |
|---|---|---|
| CN | 1313505 | 9/2001 |
| CN | 105099314 | 11/2015 |

(Continued)

OTHER PUBLICATIONS

Schramm et al. "Methods for measuring torque ripples in electrical machines," IEEE, 2017 IEEE International Electric Machines and Drives Conference (IEMDC), May 2017, 8 pages.
(Continued)

*Primary Examiner* — Kawing Chan
(74) *Attorney, Agent, or Firm* — Sheridan Ross P.C.

(57) ABSTRACT

The invention relates to a method and system for calibrating a control device, in particular an inverter control device, of an electric motor, comprising: operating the electric motor as part of a force flow; performing a force measurement by means of piezo elements which are arranged in the force flow in such a way that the force flow is applied, in particular exclusively, to the piezo elements; and adapting a control characteristic the control device on the basis of at least one force component derived from the force measurement, in particular a change in the at least one force component and/or at least one torque component derived from the force
(Continued)

Figure 1:
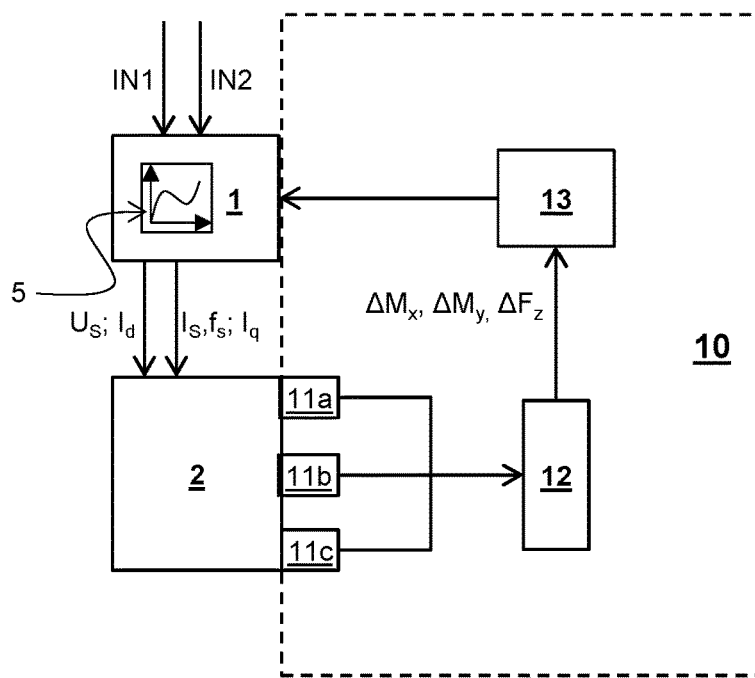

measurement, in particular a change in the torque component.

19 Claims, 5 Drawing Sheets

(51) Int. Cl.
*G01L 3/10* (2006.01)
*G01L 5/00* (2006.01)
*H02P 21/20* (2016.01)
*H02P 21/22* (2016.01)

(52) U.S. Cl.
CPC .............. *H02P 21/20* (2016.02); *H02P 21/22* (2016.02); *H02P 2207/01* (2013.01); *H02P 2207/05* (2013.01)

(58) Field of Classification Search
USPC .......................................................... 318/457
See application file for complete search history.

(56) References Cited

U.S. PATENT DOCUMENTS

| | | | |
|---|---|---|---|
| 2015/0101421 A1 | 4/2015 | Takahashi | |
| 2015/0311852 A1* | 10/2015 | Urata | H02P 6/14 318/400.2 |
| 2017/0032282 A1 | 2/2017 | Senoo | |
| 2017/0077854 A1 | 3/2017 | Son et al. | |

FOREIGN PATENT DOCUMENTS

| | | |
|---|---|---|
| CN | 208887923 U * | 5/2019 |
| DE | 102014213446 | 1/2016 |
| EP | 1081845 | 3/2001 |
| WO | WO 2019/144171 | 8/2019 |
| WO | WO 2019/144172 | 8/2019 |

OTHER PUBLICATIONS

International Search Report and Written Opinion for International (PCT) Patent Application No. PCT/AT2020/060403, dated Mar. 15, 2021, 11 pages.
English Translation of the International Search Report for International (PCT) Patent Application No. PCT/AT2020/060403, dated Mar. 15, 2021, 3 pages.
Official Action with English Translation for Japan Patent Application No. 2022-527793, dated Dec. 9, 2024, 12 pages.
Official Action with English Translation for China Patent Application No. 202080091915.1, dated Mar. 28, 2025, 23 pages.

* cited by examiner

METHOD AND SYSTEM FOR CALIBRATING A CONTROL DEVICE OF AN ELECTRIC MOTOR

CROSS REFERENCE TO RELATED APPLICATIONS

This application is a national stage application under 35 U.S.C. 371 and claims the benefit of PCT Application No. PCT/AT2020/060403 having an international filing date of 13 Nov. 2020, which designated the United States, which PCT application claimed the benefit of Austria Patent Application No. A50974/2019 filed 13 Nov. 2019, the disclosures of each of which are incorporated herein by reference in their entireties.

The invention relates to a method for calibrating a control device, in particular an inverter control device, of an electric motor, in particular a three-phase motor, wherein the electric motor is operated as part of a force flow and force measurements are carried out by means of piezo elements, the piezo elements being arranged in the force flow in such a way that the force flow is applied, in particular exclusively, to the piezo elements. Furthermore, the invention relates to a method for controlling an electric motor, in particular a three-phase motor, wherein the electric motor is operated as part of a force flow and a force measurement is carried out by means of piezo elements, which are arranged in the force flow in such a way that the force flow is applied, in particular exclusively, to the piezo elements. Furthermore, the invention relates to systems for carrying out said methods.

It is known from the state of the art to operate electric motors by using power devices, which can generate a variable voltage system, such as direct current, alternating current or three-phase current, from a rigid voltage system, such as the mains or a battery.

Particularly for three-phase motors it is necessary to transform the DC voltage from the power supply into a suitable AC voltage depending on the power requirement. Therefore, so-called inverter controllers are generally used to control the electric motors.

Furthermore, it is known from the prior art to measure forces or torques on a shaft by means of a measuring flange with piezo elements or to determine the forces or torques on a shaft via reaction forces acting between a bearing device of the shaft and a support device of the bearing device, wherein the bearing device is formed in particular by an electric machine. This is described, for example, in the document WO 2019/144172 A1. Furthermore, it is known from the document WO 2019/144171 A1 to determine torque components based on a system of equations of force measurements of different piezo elements.

Based on this prior art, one object of the invention is that of providing an improved method and system for calibrating a control device of an electric motor and an improved method and system for controlling an electric motor.

This invention solves this object with methods and systems according to the independent claims. Advantageous embodiments are claimed in the dependent claims.

A first aspect of the invention relates to a method for calibrating a control device, in particular an inverter control device, of an electric motor, comprising:
operating the electric motor as part of a force flow;
performing a force measurement by means of piezo elements which are arranged in the force flow in such a way that the force flow is applied, in particular exclusively, to the piezo elements; and
adapting a control characteristic of the control device on the basis of at least one force component derived from the force measurement, in particular a change in the at least one force component and/or at least one torque component derived from the force measurement, in particular a change in the torque component.

Preferably, the electric motor comprises or interacts with a shaft that transmits a force flow from or to the electric motor. Preferably, the method is computer-aided.

A second aspect of the invention relates to a method of controlling an electric motor, in particular a three-phase motor, comprising:
operating the electric motor as part of a force flow;
performing a force measurement by means of piezo elements which are arranged in the force flow in such a way that the force flow is applied, in particular exclusively, to the piezo elements; and
setting at least one control parameter of the electric machine on the basis of at least one force component derived from the force measurement, in particular a change in at least one force component, and/or at least one torque component derived from the force measurement, in particular a change in the torque component.

Preferably, the electric motor comprises or interacts with a shaft that transmits a force flow from or to the electric motor. Preferably, the method is computer-aided.

A third aspect of the invention relates to a system for calibrating a control device, in particular an inverter control device, of an electric motor, in particular a three-phase motor, which is part of a power train. Preferably, the system comprises:
piezo elements for performing a force measurement, wherein the piezo elements are arranged in the force flow in such a way that the force flow is applied, in particular exclusively, to the piezo elements;
evaluation means, set up for evaluating at least one force component, in particular a change in the at least one force component, and/or at least one torque component, in particular a change in the at least one torque component, from the force measurement; and
means arranged for adapting a control characteristic of the control device on the basis of the at least one force component derived from the force measurement and/or the at least one torque component derived from the force measurement.

Preferably, the electric motor comprises or interacts with a shaft that transmits a force flow from or to the electric motor.

A fourth aspect of the invention relates to a system for controlling an electric motor, in particular a three-phase motor, which is part of a force flow, comprising:
piezo elements, arranged for performing a force measurement, wherein the piezo elements are arranged in the force flow in such a way that the force flow is applied, in particular exclusively, to the piezo elements;
evaluation means, arranged for deriving at least one force component, in particular a change of the at least one force component, and/or at least one torque component, in particular a change of the at least one torque component, from the force measurement; and
control means arranged for setting at least one control parameter of the electric machine on the basis of the at least one force component derived from the force measurement and/or the at least one torque component derived from the force measurement.

Preferably, the electric motor comprises or interacts with a shaft that transmits a force flow from or to the electric motor.

A fifth aspect of the invention relates to a test bench for an electric motor, the test bench comprising a support device and a means for applying a load, in particular a dynamometer, and the electric motor being arrangeable in a force flow between the support device and the load of the test bench, the test bench further comprising a system for calibrating a control means of an electric motor.

A force flow according to the invention is preferably a path of a force and/or a torque in a mechanical system from a point of application to a point or points at which the force and/or the torque are absorbed by a reaction force and/or a reaction torque. Preferably, the force flow is composed of a force, in particular a transversal force to the direction of rotation of the shaft, and/or a torque, in particular about the axis of rotation.

A power flow according to the invention is preferably a path of a transmission of power in a mechanical system from a point of introduction to a point or points to which the power is transmitted.

A piezo element according to the invention is preferably a measuring element which is set up to measure a force acting via two surfaces in contact with the piezo element. Preferably, a piezo element comprises a piezo crystal as well as a charge dissipation or an electrical circuit.

An electric motor according to the invention is preferably an electromechanical energy converter, which preferably converts kinetic energy, in particular a rotation, into electrical energy or vice versa, electrical energy into kinetic energy.

Calibration according to the invention is preferably the application of control data to a control device. Preferably, calibration is used for tuning and/or optimizing the control of an electric motor.

A means according to the invention can be designed in terms of hardware and/or software and in particular have a processing unit, in particular a microprocessor unit (CPU), which is preferably connected to a memory and/or bus system via signal or data flow, and/or one or more programs or program modules. The CPU can be designed to process instructions implemented as a program stored in a memory system, to acquire input signals from a data bus and/or to output signals to a data bus. A memory system may have one or more, in particular different, storage media, in particular optical, magnetic, solid-state and/or other non-volatile media. The program can be created in such a way that it embodies or is capable of executing the procedures described here, so that the CPU can execute the steps of such procedures and thus in particular calibrate or control an electric motor.

A control characteristic according to the invention is preferably the way in which a control device controls or regulates the electric motor. Preferably, the control characteristic is defined by a computer program which is stored in a data memory of the control device and which implements an assignment rule. The assignment rule can be stored as an assignment function or as a table. Preferably, the control characteristic is also influenced by controllers of a control path.

Most inverter control devices for electric motors perform the calibration of the inverter control device automatically by measuring the current and voltage after an initial installation. This procedure is simple, but often does not give satisfactory results. Manual calibration, on the other hand, improves performance by 10 to 20%, especially under special conditions such as low battery charge.

In a common manual calibration, the effective torque is measured at a number of operating points under certain boundary conditions and a control characteristic is adjusted. The problem is that it takes a long time, up to several weeks, to complete such a manual calibration procedure. Furthermore, the only measured effect of a changed inverter control setting is an effective torque. Dynamic torque modes, which are particularly responsible for a loss of efficiency, are not detectable.

The invention aims to improve calibration and thus control of an electric motor by taking into account a force measurement performed by means of piezo elements when creating or adapting a control characteristic or even when setting control parameters.

The dynamics of a force component or torque component can be determined by measuring the force via the piezo elements. Particularly, torque ripples and/or a cogging torque can be determined in this way and taken into account in the control characteristics of the control device or directly when the electric motor is controlled by the control device.

The fact that the piezo elements are arranged directly within the force flow between the electric motor and a device for applying a load, in particular a dynamometer, or its holding device, means that the measurements are not limited to specific operating points. Rather, force measurements can be made throughout the operation of the electric motor at all operating points. Also, the procedure for calibration and the procedure for control are not limited to a test bench application. Rather, the piezo elements by means of which the force measurement is carried out can be arranged directly in a drive train in which the electric motor is installed, for example in a vehicle. In this way, the force measurement can be used continuously to control the electric motor.

In particular, the method according to the invention can be used to automatically calibrate and optimize a control device of an electric motor. A high accuracy of the measurement of the dynamic response and of vibration measurements can be achieved. By optimizing with respect to these two criteria, a significant improvement of the control of an electric motor can be achieved. In particular, torque ripples and energy losses, for example due to waste heat, can be reduced, to the extent that overall energy losses are minimal, which can be achieved by adjustments to the control unit without hardware adaptations.

The features and advantages of the advantageous embodiments described below with respect to the methods of the first aspect and the second aspect of the invention apply, mutatis mutandis, to the other aspects of the invention and vice versa.

In an advantageous embodiment of the method, the electric motor is a three-phase synchronous machine or three-phase asynchronous machine and the control characteristic is determined by a P component and/or an I component of a PI controller or a PID controller of at least one control parameter.

In a further advantageous embodiment of the method, the electric motor is a three-phase synchronous machine and the at least one control parameter is a rotor current, in particular its longitudinal component and transversal component in the complex vector diagram. This is particularly advantageous because the transversal component of the rotor current in particular is responsible for torque generation. Torque ripples generated by the electric motor or cogging torques can be particularly compensated in this way.

In a further advantageous embodiment, the electric motor is a three-phase asynchronous machine and the at least one control parameter is a stator voltage and/or a standing frequency or the at least one control parameter is a stator current and/or a stator frequency. In this way, too, harmful effects caused by a design of an electric motor, such as torque ripple and/or cogging torques, can be compensated particularly well.

In a further advantageous embodiment, at least one criterion for adapting a control characteristic or setting at least one control parameter is selected from a group comprising: an intensity of harmonic oscillation of the change in torque and/or force; and/or an integral of the intensity of oscillations of the change of the torque and/or the force over a predetermined frequency spectrum.

Through such criteria in relation to a frequency-resolved vibration analysis, a statement can be made about the vibration behavior of individual frequency ranges or a broad frequency spectrum. In the context of an optimization, the intensity of individual oscillations and/or of the integrated oscillations is reduced. Preferably, such an analysis is carried out during stationary operation of the electric motor.

In a further advantageous embodiment of the method, at least one criterion for adapting a control characteristic or setting at least one control parameter is selected from a group comprising:

A torque rise time from 10% of a torque demand to 90% of the torque demand;

a delay time from a time of a torque demand to the rise of the torque; and/or an intensity of overshoot of a value of 100% of a torque demand.

Such criteria in relation to a dynamic oscillation curve can be used to make a statement about the reaction of a drivetrain to a torque demand, in particular its oscillation behavior. In the context of an optimization, the intensity of overshoots, a duration of a deceleration time and/or a rise duration of the torque is reduced.

In a further advantageous embodiment of the method, force components and torque components are determined by means of a system of equations based on measurement signals of the individual piezo elements. Preferably, measurement signals of the individual piezo elements are decomposed into components which contribute to the respective force components and/or torque components to be derived. Furthermore, preferably, all contributions of the individual piezo measuring elements to the respective force components and/or torque components to be determined are taken into account. By using a system of equations which is resolved according to the respective force components and/or torque components to be determined, measurements of a plurality of piezo elements can be taken into account. In addition, all measurements of a multi-component sensor or of piezo elements can be taken into account proportionally for the force components and/or rotational components to be determined. This reduces or even avoids force bypasses via piezo elements that are not involved in a measurement.

In a further advantageous embodiment of the method, the electric motor is operated together with a shaft which transmits a force flow from or to the electric motor, the piezo elements being arranged between a first part of the shaft and a second part of the shaft in such a way that a force, in particular a shear force, to the first part and the second part can be measured by means of the piezo elements. By measuring directly in or on the shaft, a particularly simple measuring arrangement can be realized.

In a further advantageous embodiment of the method, the piezo elements measure a force, in particular a shear force, between the electric motor and a support device for supporting the electric motor. In this embodiment, the piezo elements are arranged between the electric motor and a support device. Thus, in this embodiment, the force measurement is performed with respect to a spatially fixed reference system, namely a powertrain test bench or its base plate or a vehicle. Piezo elements with transversal effect, longitudinal effect or shear effect can be used, depending on how the electric motor is mounted on the support device. By this kind of arrangement of the force sensor a rotating mass of the shaft remains essentially unchanged. In particular, a reaction torque to the torque applied to the shaft is measured.

In a further advantageous embodiment of the method, the electric motor is operated together with a shaft transmitting a force flow from or to the electric motor, wherein a measuring system using the piezo elements does not change a rotating mass of the shaft and/or a rotating mass of rotating parts of an assembly of the shaft and the electric motor.

Preferably, the methods are performed using a computer. Further aspects of the invention therefore relate to a computer program comprising instructions which, when executed by a computer, cause the computer to perform the steps of the methods, and to a computer-readable medium on which such a computer program is stored.

Figure 2:
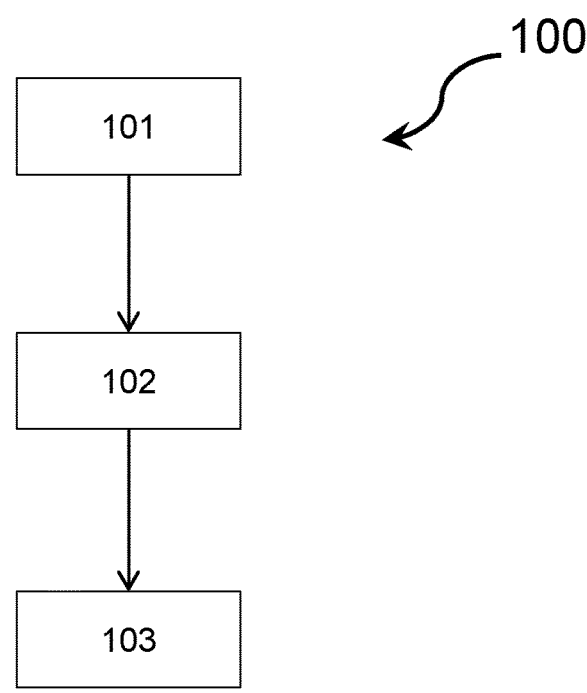
Figure 3:
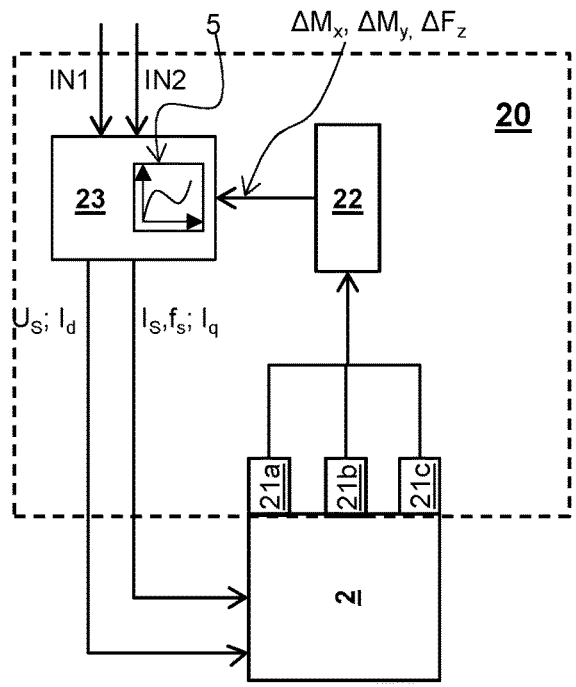
Figure 4:
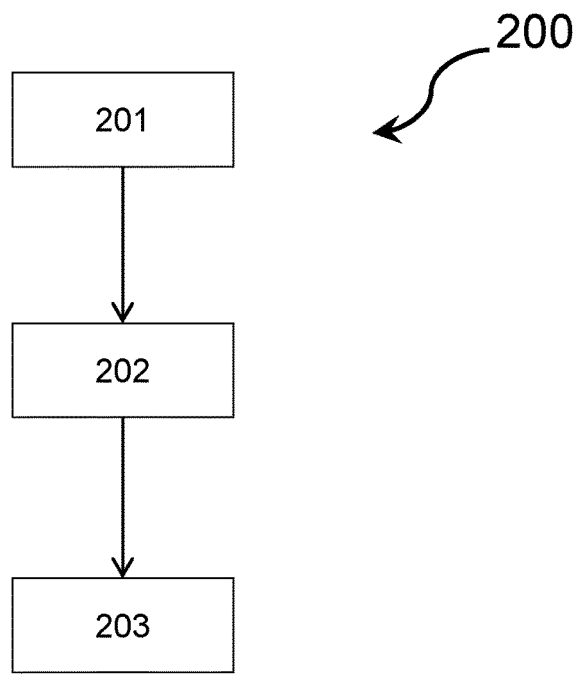
Figure 5:
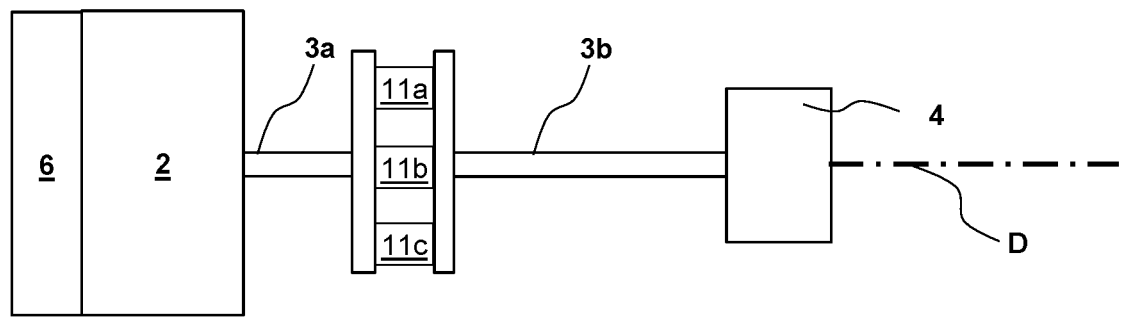
Figure 6:
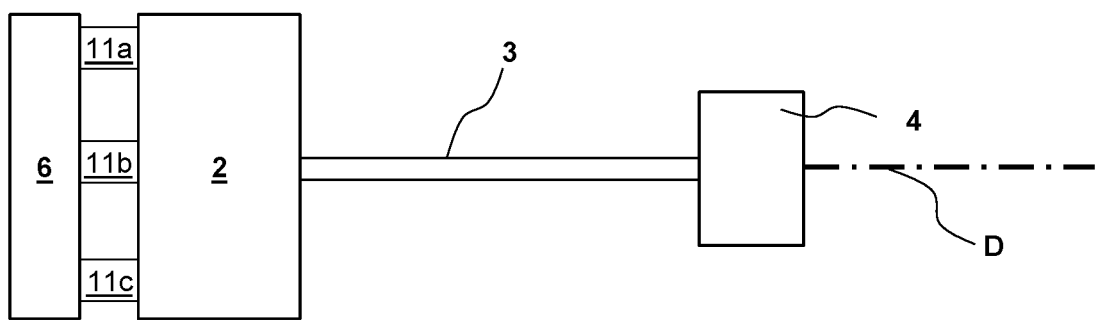
Figure 7:
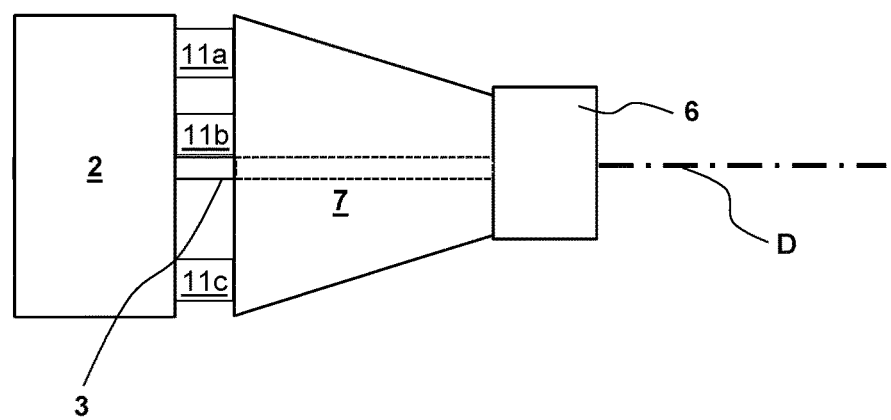
Figure 8:
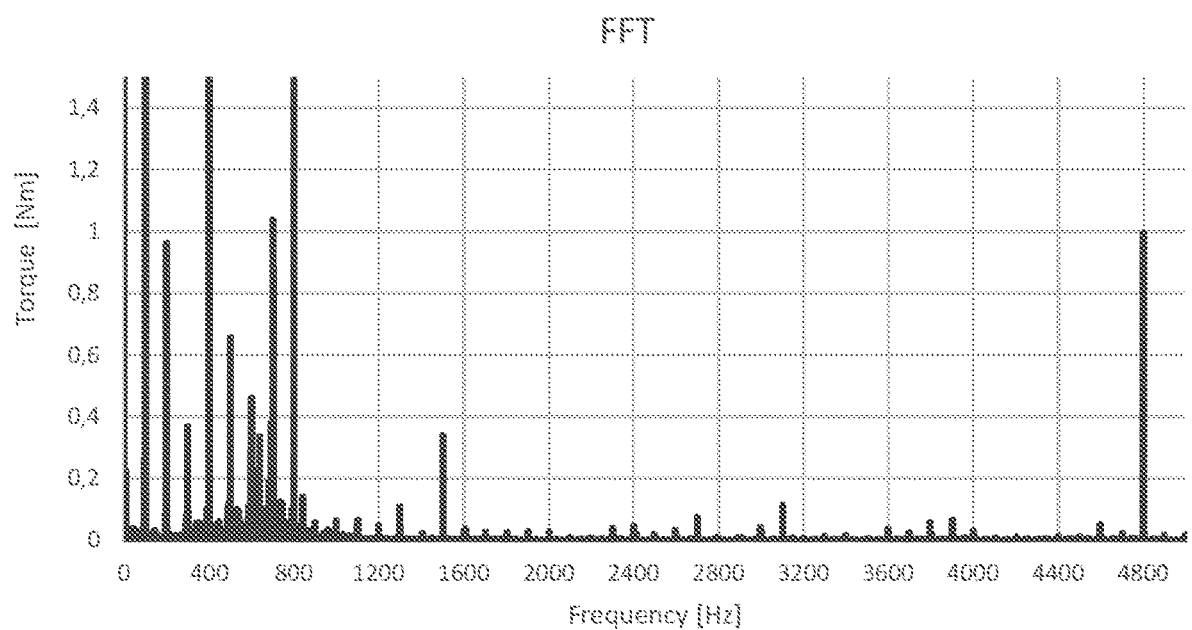
Figure 9:
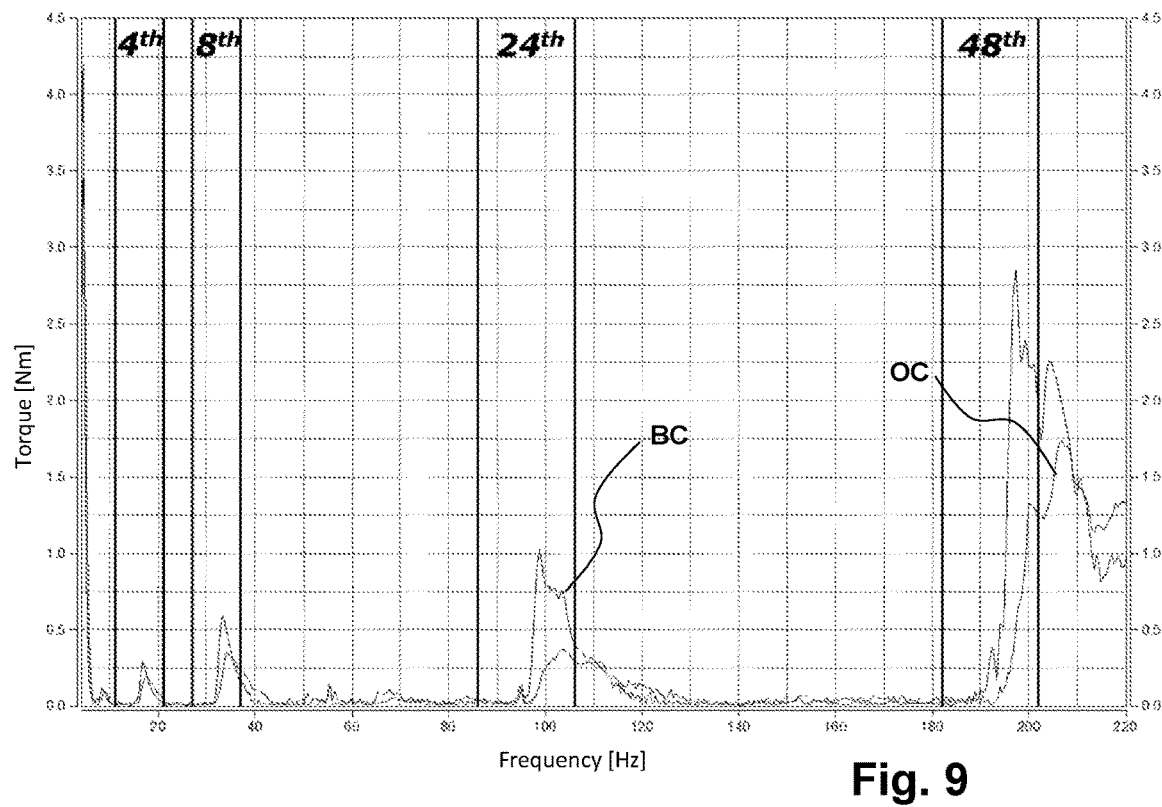
Figure 10:
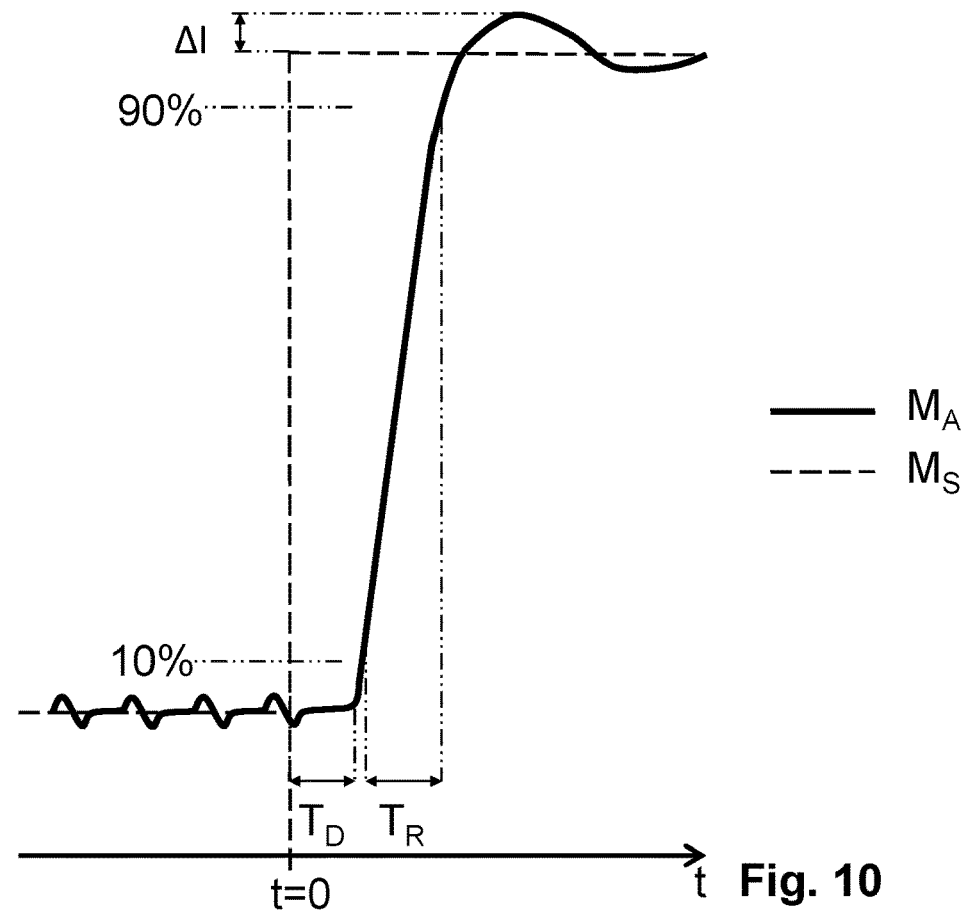

Further advantages and features will become apparent from the following description of exemplary embodiments referencing the figures. Shown therein at least partially schematically:

FIG. 1 an embodiment of a system for calibrating a control device of an electric motor;

FIG. 2 an embodiment of a method for calibrating a control device of an electric motor;

FIG. 3 an embodiment of a system for controlling an electric motor;

FIG. 4 an embodiment of a method for controlling an electric motor;

FIG. 5 a first measuring arrangement with piezo elements of an embodiment of the system for calibrating a control device or the system for controlling an electric motor;

FIG. 6 a second measuring arrangement with piezo elements of an embodiment of the system for calibrating a control device or the system for controlling an electric motor;

FIG. 7 a third measuring arrangement with piezo elements of an embodiment of the system for calibrating a control device or the system for controlling an electric motor;

FIG. 8 a diagram of a frequency spectrum of oscillations of an electric motor determined by the method for calibrating a control device or the method for controlling an electric motor;

FIG. 9 a further diagram of a frequency spectrum determined by the method of calibrating a control device or the method of controlling an electric motor; and FIG. 10 a diagram of a torque curve over time.

FIG. 1 shows an entirety of an embodiment of a system 10 for calibrating an inverter control device 1 of an electric motor 2 and the inverter control device 1 to be calibrated as well as the electric motor 2 to be controlled.

In the following, the invention is described with reference to this inverter control device 1 of a three-phase synchronous machine or three-phase asynchronous machine 2, whereby a rotor current $I_d$, $I_q$ or a stator voltage $U_S$, stator frequency $f_S$ and stator current $I_S$ are used as control parameters. However, the systems and methods described can also be used in relation to other control devices 1 and electric motors 2.

A control characteristic 5 is stored in the inverter control device 1 shown. By means of this control characteristic 5, the electric motor is controlled by the control device 1 on the basis of input variables IN1, IN2 by means of control parameters $I_d$, $I_q$, $I_S$, $f_S$, $U_S$. Input parameters IN1, IN2 are, for example, a torque demand, a speed request or also the request for a braking torque.

The system 10 for calibrating the inverter control preferably comprises piezo elements 11a, 11b, 11c, evaluation means 12 and means 13, set up for adapting a control characteristic 5.

The piezo elements 11a, 11b, 11c are arranged or mounted in a force flow comprising the electric motor 2 in such a manner that they can measure a change in force or a change in torque acting on or exerted by the electric motor 2. Based on this measurement of various piezo elements 11a, 11b, and 11c, the evaluation means 12 can calculate a change in at least one of the force components and/or a torque components $\Delta M_X$, $\Delta M_Y$, $\Delta F_Z$, $\Delta F_X$, $\Delta F_Y$, $\Delta M_Z$. In the present description and the figures, the invention is explained purely by way of example with respect to determining two torque components $\Delta M_X$, $\Delta M_Y$ and a force component $\Delta F_Z$. As a further example, the changes of two force components $\Delta F_X$, $\Delta F_Y$ and one torque component $\Delta M_Z$ can also be determined alternatively.

The means 13 for adapting the control characteristic 5 can calibrate the control characteristic 5 based on various criteria, such as NVH-related criteria or dynamics-related criteria.

Here, an optimization with respect to these criteria is possible, or also a tuning of the control characteristic with respect to, for example, a specific inverter control device 1.

FIG. 2 shows a block diagram of a method for calibrating a control device 100. Such a method can be executed in particular by means of the system 10 for calibrating a control device shown in FIG. 1. For this purpose, the system 10 preferably has means or modules which are implemented in terms of hardware or software.

In a first step 101, the electric motor is operated as part of a force flow. The electric motor 2 is controlled by means of the inverter control device 1. For this purpose, the inverter control device 1 generates electrical voltage signals of the control parameters Id, Iq, Is, fs, Us on the basis of the input parameters IN1, IN2, which reflect a driver's request or a request by a vehicle (not shown). By means of the piezo elements 11a, 11b, 11c, a force measurement 102 is performed. From this force measurement, individual force components and/or torque components ΔMx, ΔMy, ΔFz or their temporal change can be derived. This temporal change contains information about a torque ripple and/or a cogging torque.

In order to compensate for these torque ripples or cogging torques, the control characteristic 5, which is stored in the inverter control, is adapted or modified in a further working step 103.

The system 10 from FIG. 1 is preferably used on a test bench for electric drive trains. The evaluation means 12 and the means 13 for adapting the control characteristics can be part of the test bench. Data signals are recorded at a defined storage rate, preferably 100 kHz, and subjected to a Fast Fourier Transformation analysis in order to identify vibration intensities as a function of the rotational frequency of the rotor.

Of particular importance is the use of piezo elements 11a, 11b, 11c as dynamic force or torque sensors. Piezo elements provide sufficient temporal resolution for such dynamic measurement.

The control characteristic 5 or its variable parameters, in particular the I component of a PI controller stored there, are preferably changed in such a way that the criteria are optimized. In the case of NVH-related criteria and dynamics-related criteria as optimization targets, the best compromise must usually be found in this case, since they conflict with each other.

Preferably, a so-called model-based calibration or optimization method is used in the calibration process and, if necessary, in the optimization process.

A model is designed which shows a relationship between the variable parameters of the control characteristic 5 and the values of the criteria. This model can be used, for example, to target those areas in test bench trials which are particularly promising for optima or compromises between optima.

An optimization of the control characteristic preferably proceeds as follows: First, a test plan for the variable parameters of the inverter control device, in particular a P component or an I component, of a PI controller of the control parameters Id, Iq, Us, Is, fs, is prepared. On the basis of this setting of the variable parameters, experiments are carried out with the arrangement of the whole shown in FIG. 1. The operating performance achieved in each of the tests, or the individual operating points, are evaluated by means of criteria. Based on this evaluation, the control characteristics are adapted.

These criteria can be generally divided into NVH-related criteria and dynamics-related criteria.

For NVH-related criteria, various harmonic harmonics and amplitude analyses of the Fast-Fourier-transformed torque signal, especially its integral, are particularly suitable.

Among the dynamics-related criteria, for example, the so-called T90/T10 rise time is important. This is the time required for the torque to reach 90% of the requested torque when the torque demand changes from 10%. Other possible criteria are a delay time $T_D$ and an overshoot intensity $\Delta I$, as described in relation to FIG. 10 below.

The force components $F_x(t)$ and $F_y(t)$ and torque component $M_z(t)$ and the force component $F_z(t)$ and the torque components $M_x(t)$ and $M_y(t)$ can be determined in a manner known per se by means of a specific arrangement of preferred directions of the individual piezo elements 11a, 11b, 11c and summation of the individual measurement signals S1, S2, S3.

Other methods for determining these parameters can also be used. For example, a decomposition, in particular an orthogonal decomposition, of the measurement signals of the individual piezo elements 11a, 11b, 11c or of the forces $F_1, \ldots, F_i$ derived from the measurement signals.

Here, for example, the parameters to be determined $M_z$, $F_X$, $F_Y$ are the solution of a system of equations, with an equation for each measurement signal as follows:

$$S1 = a_{11} \cdot M_z + a_{12} \cdot F_x + a_{13} \cdot F_y$$
$$S2 = a_{21} \cdot M_z + a_{22} \cdot F_x + a_{23} \cdot F_y$$
$$S3 = a_{31} \cdot M_z + a_{32} \cdot F_x + a_{33} \cdot F_y$$
$$\vdots$$

-continued $$SN = a_{N1} \cdot M_z \ldots$$

wherein S1, S2, ..., Si, ..., SN are the measuring signals of the individual piezo elements 11a, 11b, 11c, 11i, ..., 11N. Each coefficient a depends on several factors, such as the respective position of the measuring element 11a, 11b, 11c, ..., 11i, ..., 11N and the orientation of the respective preferred direction in the reference system, a sensitivity of the respective measuring element 11a, 11b, 11c, 11i, ..., 11N and a possible signal loss due to a force bypass via a fastening means.

In order to solve such a system of equations for the torque $M_z$, a first transversal force component $F_x$ and a second transversal force component $F_y$, measurement signals from at least three piezo elements 11a, 11b, 11c, whose preferred directions are aligned in such a way that they lie in or are parallel to a plane, are required. Furthermore, at least two of the preferred directions must be neither parallel nor antiparallel.

For this described general case with N=3, i.e., with three piezo elements 11a, 11b, 11c, the solution of the above equation system is unambiguous. If further measuring elements are added to the measuring system 1, the system of equations is overdetermined with three parameters $M_z$, $F_x$, $F_y$ to be determined, but the measuring accuracy will be further improved.

In the case of N=4, four different systems of equations F (S1, S2, S3), F (S1, S2, S4), F (S1, S3, S4), F (S2, S3, S4) can be set up. The values determined for the individual parameters $M_z$, $F_x$, $F_y$ to be determined can then be summed up and averaged, i.e., in the case of four piezo elements 11a, 11b, 11c, 11i, ..., 11N, divided by four. Similarly, an overdetermined system of equations F (S1, S2, ..., SN) can be set up, which is solved by means of a minimization task.

If a general solution for the equation system is found, the calculation of the parameters $M_z$, $F_x$, $F_y$ to be determined can be reduced to a matrix multiplication. This has three rows and as many columns as measurement signals S1, S2, S3, ... SN are available. The matrix elements or coefficients represent the respective contributions of the individual sensors to the parameters $M_z$, $F_x$, $F_y$ to be determined.

$$\begin{pmatrix} Fx \\ Fy \\ MB \end{pmatrix} = K \begin{pmatrix} c11 & c12 & c13 & \ldots & c1N \\ c21 & c22 & c23 & \ldots & c2N \\ c31 & c32 & c33 & \ldots & c3N \end{pmatrix} \begin{pmatrix} s1 \\ s2 \\ s3 \\ \ldots sN \end{pmatrix}$$

For the decomposition of the measuring signals S1, S2, ... Si, ..., SN into components which contribute to the respective parameters $M_z$, $F_x$, $F_y$ to be determined, it is necessary that the position of the piezo elements 11a, 11b, 11c, ..., 11i, ..., 11N and the orientation of the preferred directions are known.

The geometrical parameters can be determined either from a design drawing of the powertrain test rig and from knowledge of the preferred directions of the piezo elements 11a, 11b, 11c, ..., 11i, ..., 11N.

However, the orientation of the preferred directions of the piezo elements 11a, 11b, 11c, ..., 11i, ..., 11N can also be determined by measuring the preferred directions using a calibration measurement. Preferably, the piezo elements 11a, 11b, 11c, 11i, ..., 11N are clamped between two flat plates for this purpose. In a next step, external transversal forces with known direction are applied. The preferred direction of the piezo elements 11a, 11b, 11c, ..., 11i, ..., 11N in the plane defined by the preferred direction of the piezo elements 11a, 11b, 11c, ..., 11i, ..., 11N can be determined from the magnitude of the individual measurement signals S1, S2, ..., Si, ..., SN in relation to the magnitude and direction of the applied transversal forces.

Similarly, by applying a defined torque $M_z$ and measuring the individual measurement signals S1, S2, ..., Si, ..., SN, a distance of the piezo elements 11a, 11b, 11c, ..., 11i, ..., 11N from the axis of rotation D can be determined if the preferred directions of the individual piezo elements 11a, 11b, 11c, ..., 11i, ..., 11N are known.

FIG. 3 shows an embodiment of a system 20 for controlling an electric motor 2, which is part of a force flow.

In contrast to the system 10 shown in FIG. 1, the force components and/or torque components $\Delta M_x$, $\Delta M_y$, $\Delta F_z$ derived from the force measurement by means of the piezo elements 21a, 21b, 21c are taken into account directly in the control device 23, which is, in particular, a control device. Consequently, these are preferably stored as input variables in the control characteristic 5 shown in FIG. 3 and taken into account accordingly in the characteristic diagrams and control functions.

Accordingly, the system 20 according to FIG. 3, in contrast to the system 10 according to FIG. 1, also does not have any means for adapting the control characteristic 5 itself, in the sense that a control characteristic 5 is fundamentally changed.

In particular, the system 20 has means or modules which are implemented in terms of hardware or software and are set up to execute the procedure 200 shown in FIG. 4 for controlling an electric motor 2 as follows:

The electric motor 2 is operated as part of a force flow, in particular in a vehicle 201. During this operation, force measurements are carried out by means of piezo elements 21a, 21b, 21c (202).

Here, too, the piezo elements 21a, 21b, 21c are arranged in the force flow which is also applied to the electric motor 2 in such a way that the force flow is applied, in particular exclusively, to the piezo elements 21a, 21b, 21c.

On the basis of a control characteristic 5 stored in the control means or the control device 23, which is stored in particular as a characteristic diagram or control function, control parameters $I_d$, $I_q$; $U_S$, $I_S$, $f_S$ of the electric machine 2 are set (203), wherein, in addition to other input variables IN1, IN2, the force components and/or torque components $\Delta M_x$, $\Delta M_y$, $\Delta F_z$ and/or the change calculated by the evaluation means 22 on the basis of the force measurement are taken into account as input variables.

FIGS. 5 to 7 show various measuring arrangements for determining a force and/or a torque applied to an electric motor 2. Such a measuring arrangement can be used both in a system for calibrating 10 an inverter control device 1, for example in the embodiment shown in FIG. 1, and in a system 20 for controlling an electric motor 2, for example in the embodiment shown in FIG. 3.

FIGS. 5 to 7 each show a section or detail of a drive train, the electric motor 2 being supported by a support device 6, in particular a base plate. The electric motor 2 drives a shaft 3, 3a, for example, or is driven by it.

The shaft 3, 3a, 3b each rotates about an axis of rotation D, the extension of which is indicated as a dashed line in all three figures.

In FIG. 5, three piezo elements 11a, 11b, 11c are arranged between a flange of a first shaft part 3a and a flange of a second shaft part 3b.

The piezo elements 11a, 11b, 11c are preferably held by force locking or friction locking on the end faces between the flanges, so that all force is applied via the end faces of the piezo elements 11a, 11b, 11c. Preferably, the piezo elements 11a, 11b, 11c form a force main connection in relation to a force flow. Preferably, there is little or even no force bypass.

The first shaft part 3a is non-rotatably connected or connectable to a rotor (not shown) of the electric motor. The second shaft part 3b is non-rotatably connected or connectable to a load 4. The load 4 can be formed on a test bench, for example, by one or more dynamometers.

A force flow runs from the electric motor 2 via the first shaft part 3a, the piezo elements 11a, 11b, 11c, the second shaft part 3b to the load 4 or vice versa.

The force components and/or torque components determined with a force measurement at the piezo elements 11a, 11b, 11c correspond at least essentially to those force components and/or torque components which are also applied to the electric motor 2 via the first shaft part 3a.

In the measuring arrangement shown in FIG. 6, the piezo elements 11a, 11b, 11c are arranged between the electric motor 2 and a support device 6, which serves as a support device or bearing 6 for the electric motor 2. In the measuring arrangement shown in FIG. 6, the force flow thus runs from the support device 6, which is formed by a base plate, for example, via the piezo elements 11a, 11b, 11c, the electric motor 2, the shaft 3 to the load 4, which is formed in particular by one or more dynamometers.

In this measuring arrangement, too, forces and/or torques are preferably introduced into the piezo elements 11a, 11b, 11c exclusively via the end face of the piezo elements, and the piezo elements 11a, 11b, 11c are preferably fastened between the electric motor 2 and the support device 6 by force locking, in particular by friction locking. In this measuring arrangement, too, this main force locking takes place via the piezo elements 11a, 11b, 11c, although there is preferably only a slight or no force bypass via other elements.

In the measuring arrangement according to FIG. 6, however, the force components and/or torque components applied to the electric motor 2 are not measured directly, but indirectly via the reaction forces or reaction torques provided to the electric motor 2 by the support device 6 as a counter bearing. This has the advantage over a measuring arrangement according to FIG. 5 that the piezo elements 11a, 11b, 11c or a measuring device of which they are a component do not influence the rotating mass of the shaft 3 or its moment of inertia and thus have no effect on the force measurement. Furthermore, when directly connected to the stator, the quality of the measurement signal is not affected by elasticities due to the measurement arrangement of the piezo elements 11a, 11b, 11c and by an additional mass in the shaft and is therefore particularly direct and stiff.

The measuring arrangement according to FIG. 7 essentially corresponds to the measuring arrangement of FIG. 6. In this measuring arrangement, too, a force measurement of the reaction forces is performed.

In this case, however, the support device 6 is not a base plate or bottom plate, but a device for applying a load, in particular a dynamometer or a gearbox, which is operated by the shaft 3 and on whose housing or construction 7 the electric motor is supported. For example, the element 7 is a gear bell.

In this case, the force flow runs from the device 6 via the gearbox bell 7, piezo elements 11a, 11b, 11c, the electric motor 2 and the shaft 3 back to the device 6. In the case shown, the device 6 is formed by a gearbox, which in turn is preferably connected to one or more dynamometers in a rotationally fixed manner.

FIG. 8 shows a diagram of a frequency analysis, which shows a Fast Fourier Transform analysis of the torque changes or the amplitudes of torque oscillations during operation of an electric motor 2. The torque changes were determined using the methods 100, 200, and systems 10, 20 described previously.

Here, the amplitudes of the torque oscillation are given in Newton meters as a function of the respective speed of the rotor of the electric motor 2 in Hertz.

The electric motor 2 used in the measurement was a three-phase synchronous machine with 48 slots and four pole pairs. By means of the measuring systems 10, 20 and methods 100, 200 described above, it could be determined that peaks of the torque ripple occur in particular at frequencies which are a multiple of 48 or 4.

FIG. 9 is again a diagram of a Fast Fourier Transformation analysis, where amplitudes of torque oscillation amplitudes of the rotor of the electric motor 2 are plotted against the frequency spectrum from 0 to 220 Hz. Here, two calibration states are plotted: a basic calibration BC and a calibration OC optimized by means of the method 100 for calibration.

In this case, the criteria for optimizing the control characteristic 5 were, in particular, the intensity of the 4th, 8th, 24th and 48th harmonics of the oscillation system of the electric motor 2 and a value of an integral over the intensity as a function of the frequency.

Compared to the basic calibration BC, the optimized calibration shows considerably lower amplitudes of the respective vibration modes.

FIG. 10 shows a torque curve on a shaft as a function of time. A torque demand is made at time t=0, whereby the speed of the shaft is kept constant.

A delay time $T_D$ from the torque demand to an increase of the torque, a rise time $T_R$ from reaching 10% of the value of the torque demand to 90% of the value $M_S$ of the torque demand and an overshoot intensity $\Delta I$ with respect to the newly set value $M_S$ of the torque demand can be seen. $M_A$ indicates the actual torque over time.

The above-described exemplary embodiments are merely examples which are in no way to be limiting of the scope of protection, the application or the configuration. Rather, the preceding description affords one skilled in the art a guideline for the implementation of at least one exemplary embodiment, whereby various modifications can be made, in particular with regard to the function and arrangement of the described components, without departing from the protective scope resulting from the claims and equivalent combinations of features. In particular, individual exemplary embodiments may be combined with one another.

REFERENCE SIGN LIST 1 control device
3, 3a, 3b shaft
4 load
5 control characteristic
6 support device
10 system for calibrating
11a, 11b, 11c piezo element
12 evaluation means
13 means for adjusting 20 system for controlling
21a, 21b, 21c piezo element
22 evaluation means
23 control device
D axis of rotation
IN1, IN2 input parameters
$I_d$ longitudinal component of the rotor current
$I_q$ transversal component of the rotor current
$U_S$ stator voltage
$f_S$ stator frequency
$I_S$ stator current
$T_D$ delay time
$T_R$ rise time
ΔI overshoot intensity
$M_S$ torque demand

The invention claimed is:

1. A method for calibrating a control device of an electric motor, comprising:
operating the electric motor as part of a force flow;
performing a force measurement by piezo elements which are arranged in the force flow in such a way that the force flow is applied to the piezo elements; and
adapting a control characteristic of the control device on the basis of at least one of a force component derived from the force measurement or a torque component derived from the force measurement, wherein the control characteristic is adapted based on at least one criterion, wherein the at least one criterion comprises:
a torque rise time from 10% of a torque demand of the electric motor to 90% of the torque demand; or
an intensity of overshoot of a value of 100% of the torque demand.

2. A method for controlling an electric motor, comprising:
operating the electric motor as part of a force flow;
performing a force measurement by piezo elements, which are arranged in the force flow in such a way that the force flow is applied to the piezo elements; and
setting at least one control parameter of the electric motor on the basis of at least one of a force component derived from the force measurement or a torque component derived from the force measurement, wherein the at least one control parameter is set based on at least one criterion, wherein the at least one criterion comprises:
a torque rise time from 10% of a torque demand of the electric motor to 90% of the torque demand; or
an intensity of overshoot of a value of 100% of the torque demand.

3. The method according to claim 2, wherein the electric motor is a three-phase synchronous machine and the at least one control parameter is a rotor current.

4. The method according to claim 2, wherein the electric motor is a three-phase asynchronous machine and the at least one control parameter is a stator voltage, a stator frequency, a stator current, a stator voltage and a stator frequency, or a stator current and a stator frequency.

5. The method according to claim 1, wherein the at least one criterion further comprises:
an intensity of harmonic oscillation of a change of at least one of the torque component or the force component; or
an integral of an intensity of oscillations of the change of at least one of the torque component or the force component over a given frequency spectrum.

6. The method according to claim 1, wherein at least one of the force component or the torque component is determined by a system of equations based on measurement signals of the individual piezo elements.

7. The method according to claim 1, wherein measurement signals of the individual piezo elements are decomposed into components which contribute to at least one of the respective force component or torque component to be derived.

8. The method according to claim 1, wherein measurements from all piezo elements are used to determine at least one of the respective force component or the torque component.

9. The method according to claim 1, wherein the electric motor is operated together with a shaft transmitting a force flow from or to the electric motor, wherein the piezo elements are arranged between a first part of the shaft and a second part of the shaft in such a way that, by the piezo elements, a force can be measured between the first part and the second part.

10. The method according to claim 1, wherein the piezo elements measure a force between the electric motor and a support device for supporting the electric motor.

11. The method according to claim 1, wherein the electric motor is operated together with a shaft transmitting a force flow from or to the electric motor, wherein a measuring system of the piezo elements does not change at least one of a rotating mass of the shaft or a rotating mass of rotating parts of an assembly of the shaft and the electric motor.

12. A system for calibrating a control device of an electric motor, which is part of a power train, comprising:
piezo elements for performing a force measurement, wherein the piezo elements are arranged in a force flow in such a way that the force flow is applied to the piezo elements;
an evaluation device arranged for deriving at least one of a force component or a torque component from the force measurement; and
an adjusting device for adapting a control characteristic of the control device on the basis of at least one of the force component derived from the force measurement or the torque component derived from the force measurement, wherein the control characteristic is adapted based on at least one criterion, wherein the at least one criterion comprises:
a torque rise time from 10% of a torque demand of the electric motor to 90% of the torque demand; or
an intensity of overshoot of a value of 100% of the torque demand.

13. A system for controlling an electric motor, which is part of a force flow in a vehicle, comprising:
piezo elements set up for carrying out a force measurement, the piezo elements being arranged in the force flow in such a way that the force flow is applied to the piezo elements;
an evaluation device arranged for deriving at least one of a force component or a torque component from the force measurement; and
a control device arranged for setting at least one control parameter of the electric motor on the basis of at least one of a force component derived from the force measurement or a torque component derived from the force measurement, wherein the at least one control parameter is set based on at least one criterion, wherein the at least one criterion comprises:
a torque rise time from 10% of a torque demand of the electric motor to 90% of the torque demand; or
an intensity of overshoot of a value of 100% of the torque demand.

14. A test bench for an electric motor, the test bench comprising at least one support for the electric motor and a load, and the electric motor being arrangeable in a force flow between the at least one support and the load of the test bench, the test bench further comprising a system according to claim 12.

15. The method according to claim 2, wherein the at least one criterion further comprises:
 an intensity of harmonic oscillation of a change of at least one of the torque component or the force component; or
 an integral of an intensity of oscillations of the change of at least one of the torque component or the force component over a given frequency spectrum.

16. The method according to claim 1, wherein the at least one criterion further comprises a delay time from a time of the torque demand to a rise of the torque component.

17. The method according to claim 2, wherein the at least one criterion further comprises a delay time from a time of the torque demand to a rise of the torque component.

18. The system according to claim 12, wherein the at least one criterion further comprises a delay time from a time of the torque demand to a rise of the torque component.

19. The system according to claim 13, wherein the at least one criterion further comprises a delay time from a time of the torque demand to a rise of the torque component.

* * * * *